United States Patent
Butler

(10) Patent No.: US 11,885,516 B2
(45) Date of Patent: Jan. 30, 2024

(54) REFRIGERATION LEAK DETECTION

(71) Applicant: Copeland LP, Sidney, OH (US)

(72) Inventor: Brian R. Butler, Centerville, OH (US)

(73) Assignee: Copeland LP, Sidney, OH (US)

( * ) Notice: Subject to any disclaimer, the term of this patent is extended or adjusted under 35 U.S.C. 154(b) by 619 days.

(21) Appl. No.: 16/988,269

(22) Filed: Aug. 7, 2020

(65) Prior Publication Data
US 2022/0042698 A1    Feb. 10, 2022

(51) Int. Cl.
| F24F 11/36 | (2018.01) |
| F24F 11/77 | (2018.01) |
| F24F 11/89 | (2018.01) |
| F24F 11/86 | (2018.01) |
| F24F 110/65 | (2018.01) |

(52) U.S. Cl.
CPC .............. *F24F 11/36* (2018.01); *F24F 11/77* (2018.01); *F24F 11/86* (2018.01); *F24F 11/89* (2018.01); *F24F 2110/65* (2018.01)

(58) Field of Classification Search
CPC .. F24F 11/89; F24F 11/77; F24F 11/36; F24F 11/86; F24F 2110/65; F24F 2110/66; Y02B 30/70
See application file for complete search history.

(56) References Cited

U.S. PATENT DOCUMENTS

| 5,357,781 A | 10/1994 | Tikijian |
| 5,820,262 A | 10/1998 | Lechner |
| 6,644,047 B2 | 11/2003 | Taira et al. |
| 6,655,161 B1 | 12/2003 | Koo |
| 6,701,722 B1 | 3/2004 | Seo et al. |

(Continued)

FOREIGN PATENT DOCUMENTS

| CN | 101107486 B | 6/2010 |
| CN | 101929706 | * 12/2010 |

(Continued)

OTHER PUBLICATIONS

Danfoss Application Guide: "Gas Detection in Refrigeration Systems", 2018.

(Continued)

*Primary Examiner* — Frantz F Jules
*Assistant Examiner* — Martha Tadesse
(74) *Attorney, Agent, or Firm* — Harness, Dickey & Pierce, P.L.C.

(57) ABSTRACT

A refrigeration system of a building includes: a compressor module configured to, in response to a determination that an amount of a refrigerant of the refrigeration system that is present outside of the refrigeration system and within the building is greater than a first predetermined amount, maintain a compressor off continuously for a predetermined period; and a fan module configured to, in response to the determination, maintain a fan on continuously for at least the predetermined period, and where the compressor module is further configured to, without receiving input indicative of a reset of the refrigeration system, after the compressor has been off for the predetermined period and the amount of refrigerant that is present outside of the refrigeration system within the building is less than a second predetermined amount, selectively turn the compressor on.

18 Claims, 4 Drawing Sheets

(56) References Cited

U.S. PATENT DOCUMENTS

| | | |
|---|---|---|
| 6,772,598 B1 | 8/2004 | Rinehart |
| 6,791,088 B1 | 9/2004 | Williams, II et al. |
| 6,973,794 B2 | 12/2005 | Street et al. |
| 7,197,914 B2 | 4/2007 | Maresca, Jr. et al. |
| 7,814,757 B2 | 10/2010 | Zima et al. |
| 8,899,099 B2 | 12/2014 | Grosse Bley et al. |
| 8,924,026 B2 | 12/2014 | Federspiel et al. |
| 9,222,711 B2 | 12/2015 | Ochiai et al. |
| 9,625,195 B2 | 4/2017 | Hiraki et al. |
| 9,933,205 B2 | 4/2018 | Hatomura et al. |
| 10,047,990 B2 | 8/2018 | Marshall et al. |
| 10,354,332 B2 | 7/2019 | Trainor et al. |
| 10,514,176 B2 | 12/2019 | Weinert |
| 10,533,764 B2 | 1/2020 | Yamada et al. |
| 10,569,620 B2 | 2/2020 | Vehr et al. |
| 10,571,171 B2 | 2/2020 | Gariety et al. |
| 2005/0263394 A1 | 12/2005 | Lewis et al. |
| 2010/0057263 A1 | 3/2010 | Tutunoglu |
| 2011/0112814 A1 | 5/2011 | Clark |
| 2012/0180506 A1 | 7/2012 | Ochiai et al. |
| 2012/0318011 A1 | 12/2012 | Ochiai et al. |
| 2013/0233006 A1 | 9/2013 | Morimoto et al. |
| 2015/0159931 A1 | 6/2015 | Okada et al. |
| 2015/0276290 A1 | 10/2015 | Aoyama |
| 2015/0362204 A1* | 12/2015 | Goel .................. F24F 11/36 62/180 |
| 2016/0178229 A1 | 6/2016 | Chen et al. |
| 2017/0268811 A1 | 9/2017 | Ochiai et al. |
| 2017/0284718 A1 | 10/2017 | Suzuki et al. |
| 2019/0056133 A1 | 2/2019 | Green et al. |
| 2019/0063808 A1* | 2/2019 | Suzuki .................. F24F 11/36 |
| 2019/0170599 A1 | 6/2019 | Kester |
| 2019/0170603 A1 | 6/2019 | Gupte et al. |
| 2019/0170604 A1 | 6/2019 | Kester |
| 2019/0195550 A1 | 6/2019 | Sakae et al. |
| 2019/0226705 A1 | 7/2019 | Sakae et al. |
| 2019/0242632 A1 | 8/2019 | Sakae et al. |
| 2019/0301780 A1 | 10/2019 | Schmidt et al. |
| 2019/0331377 A1 | 10/2019 | Matsuda et al. |
| 2019/0368752 A1 | 12/2019 | Shiohama et al. |
| 2019/0390876 A1 | 12/2019 | Matsuda et al. |
| 2020/0011580 A1 | 1/2020 | Matsuda et al. |
| 2020/0124306 A1 | 4/2020 | Kowald et al. |
| 2020/0182734 A1 | 6/2020 | Ueno et al. |
| 2020/0240673 A1* | 7/2020 | Crawford .................. F24F 11/64 |
| 2020/0248919 A1 | 8/2020 | Green et al. |
| 2020/0318840 A1 | 10/2020 | Wada et al. |
| 2020/0324624 A1 | 10/2020 | Repice et al. |

FOREIGN PATENT DOCUMENTS

| | | | |
|---|---|---|---|
| CN | 101929706 A | * 12/2010 | ............ F25B 49/005 |
| CN | 108488916 A | 9/2018 | |
| CN | 108763721 A | 11/2018 | |
| CN | 110500708 A | 11/2019 | |
| EP | 1970651 A1 | 9/2008 | |
| EP | 3051236 A1 | 8/2016 | |
| EP | 3287720 A1 | 2/2018 | |
| EP | 3358278 A1 | 8/2018 | |
| EP | 3418655 A1 | 12/2018 | |
| EP | 1970651 B1 | 7/2019 | |
| EP | 3604981 A1 | 2/2020 | |
| GB | 2555256 B | 9/2020 | |
| JP | 6333481 B2 | 5/2018 | |
| KR | 20150012947 A | 2/2015 | |
| KR | 101989752 B1 | 6/2019 | |
| WO | WO-2013183414 A1 | 12/2013 | |
| WO | WO-2017058997 A1 | 4/2017 | |
| WO | WO-2019150462 A1 | 8/2019 | |

OTHER PUBLICATIONS

Examiner-Initiated Interview Summary regarding U.S. Appl. No. 16/940,843 dated Feb. 5, 2021.

Feng, Shaobin, et al. "Review on Smart Gas Sensing Technology," MDPI Journal on Sensors 2019; Basel Switzerland, Published Aug. 30, 2019.

Islam, Tarikul and Mukjopadhyay, S.C.; "Linearization of the Sensors Characteristics: a review", Exeley International Journal on Smart Sensing and Intelligent Systems Article DOI 10.21307/ijssis-2019-007; Isue 1 Volune 12; 2019.

Nevanda Nano: "Leak Detection Technologies for A2L Refrigerants in HVACR Equipment: Summary of AHRTI Final Report Findings" SM-AN-0012-02.

U.S. Appl. No. 16/921,535, filed Jul. 6, 2020, Andrew M. Welch.

U.S. Appl. No. 16/940,808, filed Jul. 28, 2020, Brian R. Butler.

U.S. Appl. No. 16/940,843, filed Jul. 28, 2020, Brian R. Butler.

Applicant-Initiated Interview Summary regarding U.S. Appl. No. 16/940,843 dated May 4, 2021.

Final Office Action regarding U.S. Appl. No. 16/940,843 dated Mar. 18, 2021.

Non-Final Office Action regarding U.S. Appl. No. 16/921,535 dated Apr. 21, 2021.

Notice of Allowance regarding U.S. Appl. No. 16/921,535 dated Aug. 23, 2021.

Notice of Allowance regarding U.S. Appl. No. 16/940,843 dated Jun. 7, 2021.

U.S. Appl. No. 17/470,739, filed Sep. 9, 2021, Brian R. Butler.

International Search Report for Application No. PCT/US2021/040520 dated Oct. 29, 2021.

Non-Final Office Action regarding U.S. Appl. No. 17/470,739 dated Nov. 23, 2022.

Written Opinion of the ISA regarding Application No. PCT/US2021/040520 dated Oct. 29, 2021.

* cited by examiner

REFRIGERATION LEAK DETECTION

FIELD

The present disclosure relates to heating ventilation and air conditioning (HVAC) and other types of refrigeration systems and more particularly to a refrigeration leak detection and mitigation system and method for an HVAC or refrigeration system.

BACKGROUND

This section provides background information related to the present disclosure which is not necessarily prior art.

Refrigeration and air conditioning applications are under increased regulatory pressure to reduce the global warming potential of the refrigerants they use. In order to use lower global warming potential refrigerants, the flammability of the refrigerants may increase.

Several refrigerants have been developed that are considered low global warming potential options, and they have an ASHRAE (American Society of Heating, Refrigerating and Air-Conditioning Engineers) classification as A2L, meaning mildly flammable. The UL (Underwriters Laboratory) 60335-2-40 standard, and similar standards, specifies a predetermined (M1) level for A2L refrigerants and indicates that A2L refrigerant charge levels below the predetermined level do not require leak detection and mitigation.

SUMMARY

This section provides a general summary of the disclosure, and is not a comprehensive disclosure of its full scope or all of its features.

HVAC systems using A2L refrigerants may be required to have leak detection and mitigation capabilities. A control system may be used to ensure proper operation of an HVAC system while providing occupants of a building with the maximum amount of comfort and avoid nuisance issues.

A2L (mildly flammable) refrigerant may be used as refrigerant for refrigeration and HVAC systems. Due to the flammability, systems using A2L refrigerants may be required to mitigate any leaks that may occur. This may be done by running the indoor fan in an air handler to disperse leaked refrigerant so the concentration in the building is lessened. The system may automatically be reset after a mitigation event.

The present application allows the system to be manually reset (e.g., by the building owner) to put the system in a reduced capacity mode so some cooling is available, but les cooling than at full capacity.

The present disclosure relates to a resettable algorithm for a refrigerant sensor or detection system for sensing leaked refrigerant (e.g., A2L). A control module controls the system, and a switch is used to manually reset the system. The system also resets automatically after A2L leak has been mitigated and allows the system to return to normal operation.

If more than 3 (or some other pre-determined number) of leak events occur, the control module may lock out the compressor (maintain the compressor of) and require that a contractor be contacted or the building owner may be required to contact the contractor.

The system may be manually or automatically reset if the refrigerant leak level exceeds a predetermined level (e.g., 25% or another suitable level) of the lower flammability limit (LFL) for the refrigerant being used in the system. When the compressor has been locked out due to the refrigerant leak event, the control module may maintain the lock out of the compressor until a contractor comes to the home to service the system. The system may also enable the sensor/control module to retain a predetermined period (e.g., the last 7-days or other time period) of data so that the contractor can use this information for diagnostic purposes.

The present application therefore controls mitigation while ensuring operation while providing the homeowner with a maximum amount of comfort and avoiding nuisance issues.

A vapor compression system, includes a refrigeration cycle including a compressor, a condenser, an expansion valve and an evaporator. A refrigerant leak sensor is disposed adjacent to a component of the refrigeration cycle. A fan is associated with the vapor compression system. A control module that controls operation of the compressor and the fan and that receives signals from the refrigeration leak sensor, wherein upon detection of a leak, the control module automatically resets operation of the vapor compression system after a refrigerant leak has been mitigated by the fan and allows the system to return to normal operation.

In a feature, a refrigeration system of a building includes: a compressor module configured to, in response to a determination that an amount of a refrigerant of the refrigeration system that is present outside of the refrigeration system within a building is greater than a first predetermined amount, maintain a compressor of the refrigeration system off continuously for at least a predetermined period; and a fan module configured to, in response to the determination that the amount of the refrigerant that is present outside of the refrigeration system within the building is greater than the first predetermined amount, maintain a fan on continuously for at least the predetermined period, where the fan moves air across an evaporator of the refrigeration system when the fan is on, where the compressor module is further configured to, without receiving input indicative of a reset of the refrigeration system, after the compressor has been off for the predetermined period and the amount of refrigerant that is present outside of the refrigeration system within the building is less than a second predetermined amount, selectively turn the compressor on.

In further features, a sensor configured to measure the amount of the refrigerant that is present outside of the refrigeration system within the building.

In further features, the sensor is disposed adjacent to the evaporator.

In further features, the second predetermined amount is less than the first predetermined amount.

In further features, the refrigerant has an American Society of Heating, Refrigerating and Air-Conditioning Engineers (ASHRAE) classification of A2L.

In further features, the compressor module is configured to maintain the compressor off until the input indicative of the reset of the refrigeration system is received when a number of events that the amount of the refrigerant present outside of the refrigeration system within the building was greater than the first predetermined amount is greater than a predetermined number of events.

In further features, the predetermined number of events is an integer greater than one.

In further features, the compressor module is configured to maintain the compressor off until the input indicative of the reset of the refrigeration system is received when the amount of the refrigerant present outside of the refrigeration system within the building exceeded a third predetermined amount.

In further features, the third predetermined amount is greater than the second predetermined amount.

In further features, the third predetermined amount is at least 20 percent of a lower flammability limit (LFL) of the refrigerant.

In further features, a lockout module is configured to, in response to the determination that the amount of the refrigerant that is present outside of the refrigeration system within the building is greater than the first predetermined amount, prevent one or more ignition devices from igniting for at least the predetermined period.

In a feature, a method includes: in response to a determination that an amount of a refrigerant of a refrigeration system that is present outside of the refrigeration system within a building is greater than a first predetermined amount, maintaining a compressor of the refrigeration system off continuously for at least a predetermined period; in response to the determination that the amount of the refrigerant that is present outside of the refrigeration system within the building is greater than the first predetermined amount, maintaining a fan on continuously for at least the predetermined period, where the fan moves air across an evaporator of the refrigeration system when the fan is on; and without receiving input indicative of a reset of the refrigeration system, after the compressor has been off for the predetermined period and the amount of refrigerant that is present outside of the refrigeration system within the building is less than a second predetermined amount, selectively turning the compressor on.

In further features, the method further includes measuring the amount of the refrigerant that is present outside of the refrigeration system within the building using a sensor.

In further features, the sensor is disposed adjacent to the evaporator.

In further features, the second predetermined amount is less than the first predetermined amount.

In further features, maintaining the compressor off includes maintaining the compressor off until the input indicative of the reset of the refrigeration system is received when a number of events that the amount of the refrigerant present outside of the refrigeration system within the building was greater than the first predetermined amount is greater than a predetermined number of events.

In further features, maintaining the compressor off includes maintaining the compressor off until the input indicative of the reset of the refrigeration system is received when the amount of the refrigerant present outside of the refrigeration system within the building exceeded a third predetermined amount.

In further features, the third predetermined amount is greater than the second predetermined amount.

In further features, the third predetermined amount is at least 20 percent of a lower flammability limit (LFL) of the refrigerant.

In further features, the method further includes, in response to the determination that the amount of the refrigerant that is present outside of the refrigeration system within the building is greater than the first predetermined amount, preventing one or more ignition devices from igniting for at least the predetermined period.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
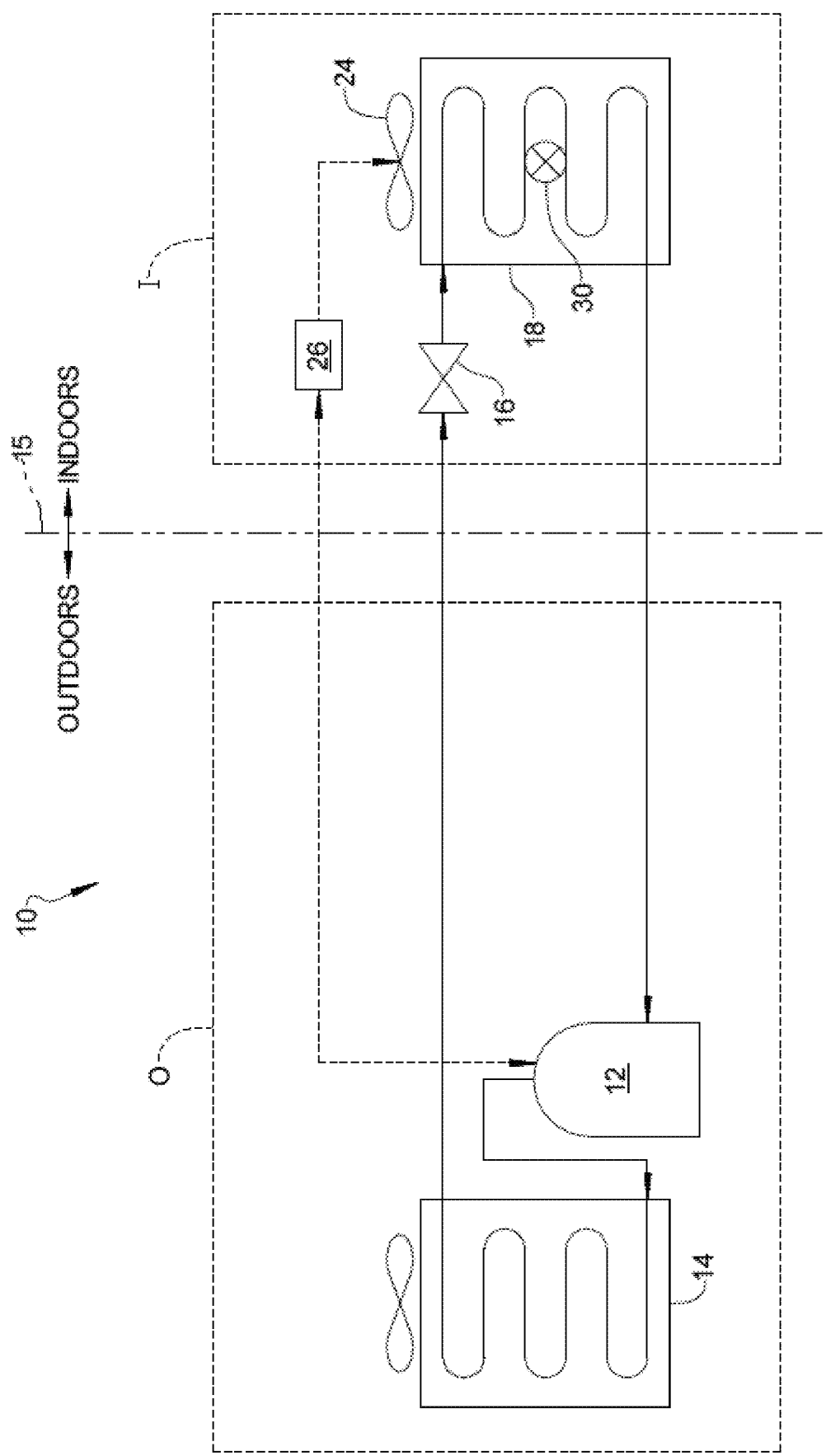
FIG. 1 is a schematic view of an example refrigeration system including a leak sensor.

With reference to FIG. 1, a schematic view of an example refrigeration (e.g., air conditioning) system 10 is shown including a compressor 12 and a condenser 14 which may be disposed outside of a building (i.e., outdoors) and an expansion valve 16 and an evaporator 18 that may be disposed inside of the building (i.e., indoors).

A fan 24 is provided adjacent to the evaporator 18 and blows air across the evaporator 18. A control module 26 controls operation (e.g., on, off, speed) of the fan 24. The fan 24 can be a whole house fan (e.g., configured to blow air across the evaporator 18 and through ducts of the refrigeration system 10) or alternatively, the can be a ventilation system fan or an air exchange system fan. The control module 26 can also control operation of the compressor 12 (e.g., on, off, speed, capacity).

A refrigerant leak sensor 30 or other leak detection system is provided for detecting leaked refrigerant. The leak sensor 30 may be, for example, an infrared leak sensor, an optical leak sensor, a chemical leak sensor, a thermal conductivity leak sensor, an acoustic leak sensor, an ultrasonic leak sensor, or another suitable type of leak sensor. Alternatively, a leak detection module may an amount of refrigerant within the refrigerant system and detect a leak when the amount of refrigerant decreases by a predetermined amount. The leak detection module may calculate the amount of refrigerant, for example, based on one or more measurements, such as one or more refrigerant pressures, one or more refrigerant temperatures, etc.

In various implementations, the control module 26 receives signals from the leak sensor 30 may communicate with a second control module if a leak is detected.

The leak sensor 30 and/or the control module 26 may include (e.g., non-volatile) memory in case of a loss of power. The loss of power could be due to grid power interruption, cycling power to the refrigeration system, etc. If the refrigeration system has been locked out due to an A2L refrigerant leak event, the control module 26 may maintain the lockout until a contractor resets the refrigeration system.

The leak sensor 30 and/or the control module 26 may store and retain a predetermined period of data (e.g., data from the last 7 days or another suitable period) so that the contractor can use this information for diagnostic purposes. The leak sensor 30 may disposed near or at the evaporator 18, such as near or at a midpoint of the evaporator 18.

The control module 26 communicates with the compressor 12, the fan 24, and the leak sensor 30. The control module 26 may communicate wirelessly or by wire and may communicate directly or indirectly through another device or control module.

The control module 26 can include a single module or multiple control modules and can be implemented as part of a control board, furnace board, thermostat, air handler board, contactor, or diagnostic system. The control module 26 can include power conditioning circuitry to supply power to electronic devices using 24 Volts (V) alternating current (AC), 120V to 240V AC, 5V direct current (DC) or another suitable power.

The control module 26 can include a bidirectional communication port which can be wired, wireless, or both. The port may be used, for example, for system debugging, programming, updating, monitoring, parameter value/state transmission etc.

The refrigeration system 10 can be used at a residential home or another type of residential, commercial, or industrial building.

When a leak is detected by the control module 26, the control module 26 may turn ON the fan 24 and/or one or more other mitigation devices to dissipate any leaked refrigerant. Additionally, the control module 26 may disable/lockout operation of any ignition sources.

According to the present disclosure, the control module 26 automatically resets the refrigeration system 10 after the refrigeration leak has been mitigated and allows the refrigeration system 10 to return to normal operation. The control module 26 can output a warning to an owner or an operator of the building a when a leak has been detected. The warning may be, for example, a visual warning, an audible warning, both, or another suitable type of warning.

After at least a predetermined number (e.g., 3 or another suitable number) of refrigerant leak events, the control module 26 may disable the refrigeration system 10 until the refrigeration system 10 is manually reset, such as via receiving a reset input from an owner or operator of the building or a contractor. In various implementations, the control module 26 may require a manual reset only if the refrigerant leak level (e.g., an amount of refrigerant that has leaked) exceeds a predetermined value (e.g., 25% of the lower flammability limit (LFL)) for the refrigerant being used. If the refrigeration system has been locked out due to a refrigerant leak event, the control module 26 may maintain the lockout until, for example, a contractor resets the refrigeration system 10. The control module 26 may receive a manual reset, for example, from a reset actuator in response to user input to the reset actuator, from an external device (e.g., via the port), from the thermostat in response to user input to the thermostat, or in another suitable manner.

The control module 26 may store at least a predetermined amount (e.g., the last 7 days or another suitable period) of measurements from the sensor 30 and other data so that a contractor can use this stored information, for example, for diagnostic purposes. The other data can include system runtime date, time/date of leak events, how high the gas concentration level got during each leak event, how long it took to mitigate each leak event, and other suitable data.

Figure 2:
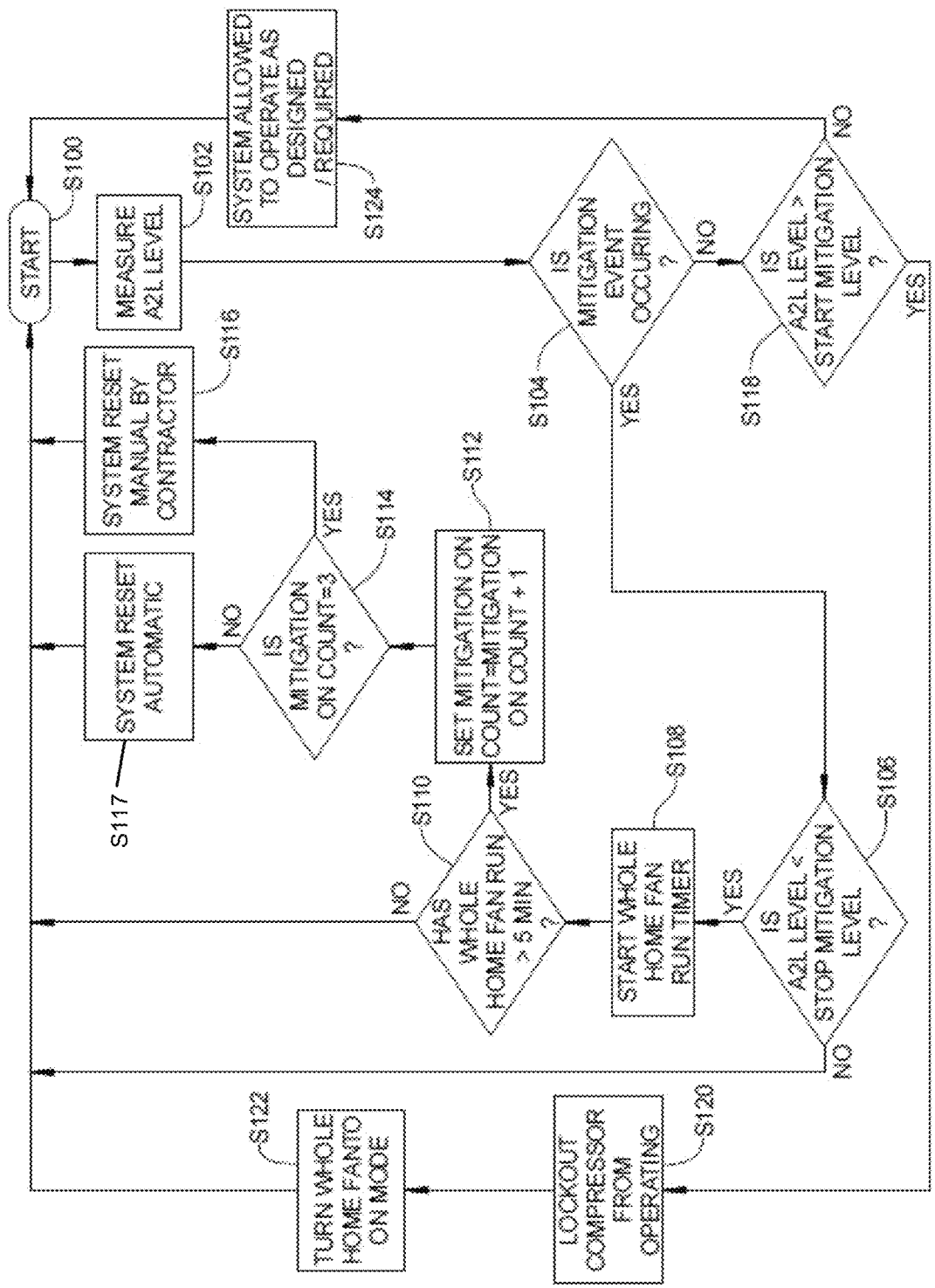
FIG. 2 is a flowchart depicting an example method of automatically resetting operation of the refrigeration system after a refrigerant leak has been mitigated and allowing the system to return to normal operation unless a predetermined number of leaks have been detected.

FIG. 2 is a flowchart depicting an example method of automatically resetting the refrigeration system after a refrigerant leak has been mitigated and allowing the refrigeration system to return to normal operation. Control begins at S100 and proceeds to S102. At S102, the control module 26 measures or determines the amount of the refrigerant in the refrigeration system (the A2L refrigerant level).

At S104, the control module 26 determines whether a mitigation event is occurring. If a mitigation event is occurring, control continues with S106. If a mitigation event is not occurring, control continues with S118, which is discussed further below.

At S106, the control module 26 determines whether the A2L refrigerant level (measurement from the sensor 30, such as concentration) is less than a predetermined stop mitigation level. The predetermined stop mitigation level may be a predetermined level (amount) where mitigation of a leak can be stopped and may be calibrated. For example only, the predetermined stop mitigation level may be 1% of the LFL of the refrigerant or another suitable value. If S106 is true, control continues with S108. If S106 is false, control returns to S100.

At S108, the control module 26 turns on a whole house fan (e.g., the fan 24) of the building and starts incrementing a fan run timer. The fan run timer therefore tracks the period that the whole house fan has been on. At S110, the control module 26 determines whether the whole house fan has been on for a predetermined period (e.g., whether the fan run timer is greater than a predetermined value). For example only, the predetermined period may be approximately 5 minutes or another suitable period. If S110 is true, control continues with S112. If S110 is false, control returns to S100.

At S112, the control module 26 increments a mitigation ON counter. The mitigation ON counter therefore tracks the number of mitigation events performed to mitigate refrigerant leaks. The control module 26 may also turn off the whole house fan at S112.

At S114, the control module 26 determines whether the mitigation ON counter is greater than or equal to a predetermined value. For example only, the predetermined value may be 3 or another suitable integer that is greater than zero. If S114 is true, the control module 26 may maintain the compressor 12 disabled and maintain the lockout of the refrigeration system 10 until a manual reset is received at S116, such as from a contractor or an owner or operator of the building. If S114 is false, the control module 26 automatically resets the refrigeration system 10 and allows the compressor 12 to be turned back on (e.g., as requested by a thermostat) at S117. Control returns to S100.

Referring back to S118 (when S104 is false—a mitigation event is not occurring), the control module 26 determines whether the A2L refrigerant level (measured by the sensor 30) is greater than a predetermined start mitigation level. The predetermined start mitigation level may be a predetermined level (e.g., concentration) where mitigation of a leak should be started and may be calibrated. For example only, the predetermined start mitigation level may be greater than or equal to the predetermined stop mitigation level (e.g., greater than or equal to 1% of the LFL of the refrigerant) or another suitable value.

If S118 is true, control continues with S120. If S118 is false, control continues with S124. At S120, the control module 26 locks out the compressor 12 thereby preventing the compressor 12 from being turned on (e.g., despite requests from the thermostat). At S122, the control module 26 turns on the whole house fan (e.g., the fan 24). At S124, the control module 26 allows the refrigeration system 10 to operate in a normal operation mode (e.g., turn on and off the compressor based on requests from the thermostat, etc.).

Figure 3:
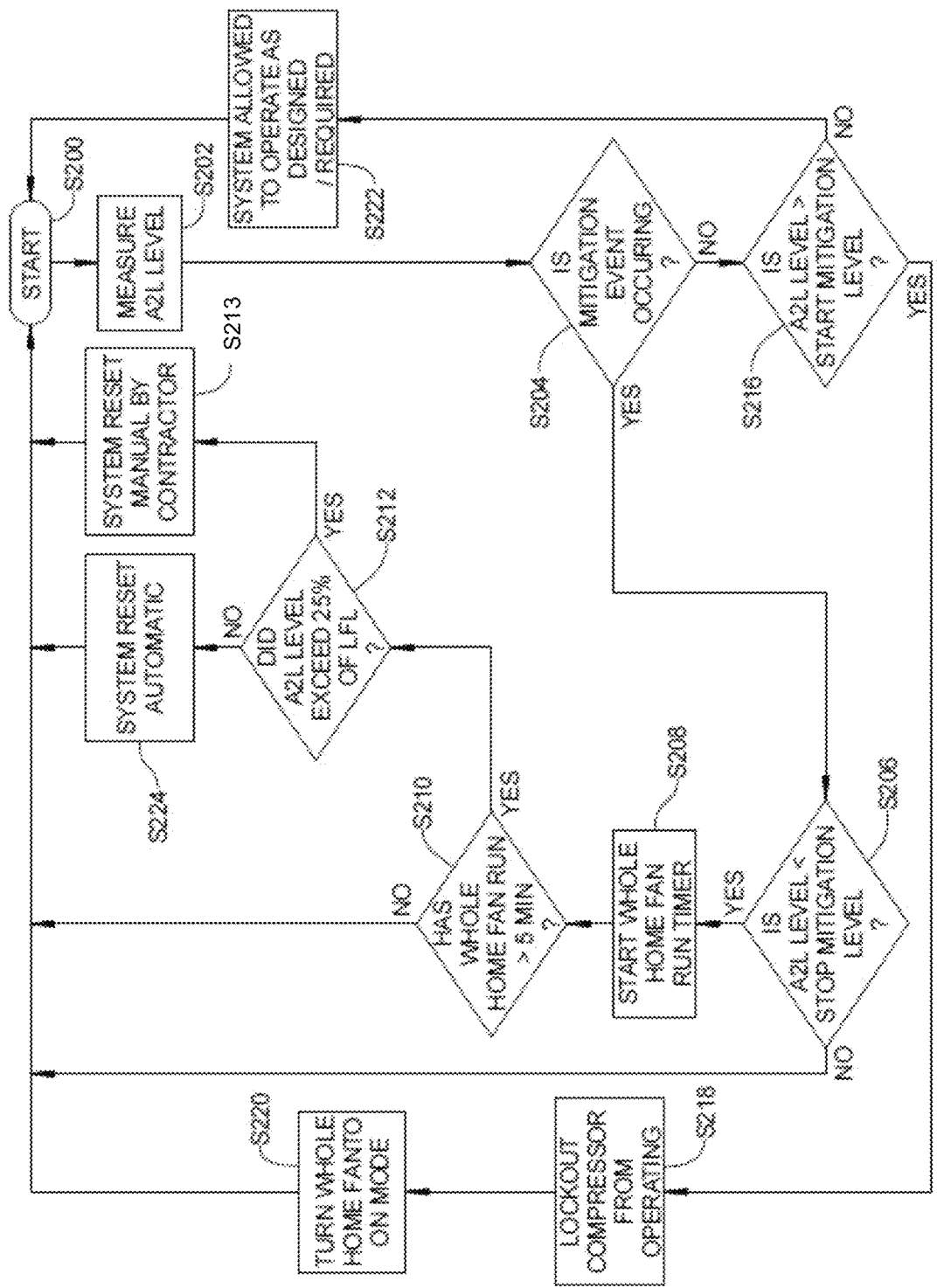
FIG. 3 is a flowchart depicting an example method of automatically resetting operation of the refrigeration system after a refrigerant leak has been mitigated and allowing the system to return to normal operation unless leakage of an A2L refrigerant level exceeds a predetermined level.

FIG. 3 is a flowchart depicting an example method of automatically resetting the refrigeration system after a refrigerant leak has been mitigated and allowing the refrigeration system 10 to return to normal operation unless an A2L refrigerant level (measurement from the sensor 30) is greater than a predetermined lockout level (e.g., 25% of LFL for the refrigerant).

Control starts at S200 and proceeds to S202. At S202, the control module 26 determines the A2L refrigerant level (e.g., the measurement from the sensor 30). The A2L refrigerant level may reflect the amount (e.g., concentration) of the A2L refrigerant at the sensor 30.

At S204, the control module 26 determines whether a mitigation event is occurring. If a mitigation event is occurring, control continues with S206. If a mitigation event is not occurring, control continues with S216, which is discussed further below.

At S206, the control module 26 determines whether the A2L refrigerant level (measured by the sensor 30) is less than the predetermined stop mitigation level. If S206 is false, control may return to S200. If S206 is true, control may continue with S208.

At S208, the control module 26 turns on the whole house fan (e.g., the fan 24) and starts incrementing the fan run timer. At S210, the control module 26 determines whether the whole house fan has been on for a predetermined period (e.g., whether the fan run timer is greater than or equal to a predetermined value). The predetermined period may be, for example, approximately 5 minutes or another suitable period. If S210 is false, the control module 26 leaves the whole house fan on and control returns to S200. If S210 is true, control continues with S212.

At S212, the control module 26 determines whether the A2L refrigerant level has been greater than (or equal to) the predetermined lockout level. The predetermined lockout level may be calibrated and may be, for example, 25% of the LFL of the refrigerant or another suitable value.

If S212 is true, control continues with S213 where and the control module 26 disables the compressor and maintains the lockout of the refrigeration system 10 until a manual reset is received, such as from a contractor or an owner or operator of the building. If S212 is false, the control module 26 automatically resets the refrigeration system 10 and allows the compressor 12 to be turned back on (e.g., as requested by a thermostat) at S224. Control returns to S200.

Returning to S216 (when S204 is false and a mitigation event is not occurring), the control module 26 determines whether the A2L refrigerant level measured by the sensor 30 is greater than the predetermined start mitigation level. If S216 is true, control continues with S218. If S216 is false, control transfers to S222. to S218 where the compressor is locked out from operating.

At S218, the control module control module 26 locks out the compressor 12 thereby preventing the compressor 12 from being turned on (e.g., despite requests from the thermostat). At S220, the control module 26 turns on the whole house fan (e.g., the fan 24). At S222, the control module 26 allows the refrigeration system 10 to operate in a normal operation mode (e.g., turn on and off the compressor based on requests from the thermostat, etc.).

Figure 4:
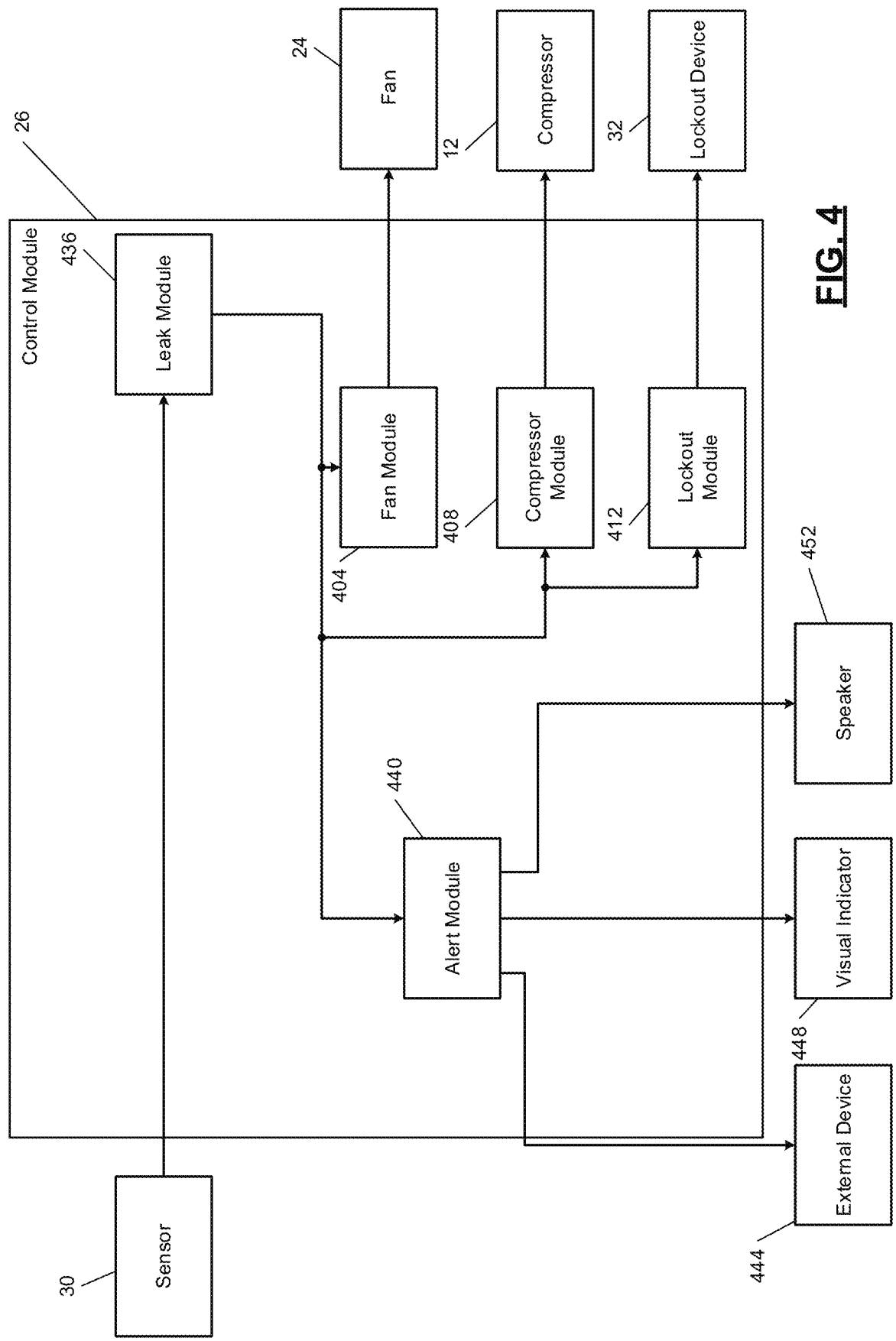
FIG. 4 is a functional block diagram of an example control system.

FIG. 4 is a functional block diagram of an example control system. A fan module 404 controls operation (e.g., on, off, speed) of the fan 24, as discussed above. A compressor module 408 controls operation (e.g., on, off, speed, capacity, etc.) of the compressor 12, as discussed above. A lockout module 412 controls actuation of the lockout device, as discussed above. The lockout module 412 may also control locking out of the compressor 12, as discussed above.

A leak module 436 determines whether a leak is present (i.e., refrigerant is leaking from the refrigeration system within the building) based on the A2L refrigerant level (e.g., measured by the leak sensor 30). Alternatively, the A2L refrigerant level may be determined based on one or more other measured parameters. For example, the leak module 436 may determine that a leak is present when the A2L refrigerant level is greater than the predetermined start mitigation level. The leak module 436 may determine that a leak has been mitigated (and no leak is present) when the A2L refrigerant level is less than the predetermined stop mitigation level.

The leak module 436 generates a signal that indicates whether a leak is present based. For example, the leak module 436 may set the signal to a first state when a leak is present and set the signal to a second state when a leak is not present.

One or more remedial actions may be taken when a leak is present. For example, the fan module 404 may turn on the fan 24 when a leak is present, as discussed above. Additionally, the compressor module 408 may turn off the compressor 12 and maintain the compressor 12 off until the leak is remediated, as discussed above. However, the compressor module 408 may maintain the compressor 12 off when the mitigation on counter is greater than or equal to the predetermined value or the A2L refrigerant level is greater than or equal to the predetermined lockout level. Additionally, the lockout module 412 may actuate the lockout device 32 to prevent ignition by one or more ignition devices within the building. The lockout module 412 may maintain the state of the lockout device 32 for a predetermined period, such as to allow the refrigerant leak to dissipate.

Additionally, an alert module 440 may generate one or more indicators when a leak is present. For example, the alert module 440 may transmit an indicator to one or more external devices 444, generate one or more visual indicators 448 (e.g., turn on one or more lights, display information on one or more displays, etc.), and/or generate one or more audible indicators, such as via one or more speakers 452.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A refrigeration system of a building, comprising: a compressor module configured to, in response to a determination that an amount of a refrigerant of the refrigeration system that is present outside of the refrigeration system within the building is greater than a first predetermined amount, maintain a compressor of the refrigeration system off continuously for at least a predetermined period; and
a fan module configured to, in response to the determination that the amount of the refrigerant that is present outside of the refrigeration system within the building is greater than the first predetermined amount, maintain a fan on continuously for at least the predetermined period, wherein the fan moves air across an evaporator of the refrigeration system when the fan is on, and wherein the compressor module is further configured to: without receiving input indicative of a reset of the refrigeration system, after the compressor has been off for the predetermined period and the amount of refrigerant that is present outside of the refrigeration system within the building is less than a second predetermined amount, automatically turn the compressor on; and after a predetermined number of refrigerant leak events occur, disable the refrigeration system until user input indicative of a manual reset is received.

2. The refrigeration system of claim 1 further comprising a sensor configured to measure the amount of the refrigerant that is present outside of the refrigeration system within the building.

3. The refrigeration system of claim 2 wherein the sensor is disposed adjacent to the evaporator.

4. The refrigeration system of claim 1 wherein the second predetermined amount is less than the first predetermined amount.

5. The refrigeration system of claim 1 wherein the refrigerant has an American Society of Heating, Refrigerating and Air-Conditioning Engineers (ASHRAE) classification of A2L.

6. The refrigeration system of claim 1 wherein the predetermined number of events is an integer greater than one.

7. The refrigeration system of claim 1 wherein the compressor module is configured to maintain the compressor off until the input indicative of the reset of the refrigeration system is received when the amount of the refrigerant present outside of the refrigeration system within the building exceeded a third predetermined amount.

8. The refrigeration system of claim 7 wherein the third predetermined amount is greater than the second predetermined amount.

9. The refrigeration system of claim 7 wherein the third predetermined amount is at least 20 percent of a lower flammability limit (LFL) of the refrigerant.

10. The refrigeration system of claim 1 further comprising a lockout module configured to, in response to the determination that the amount of the refrigerant that is present outside of the refrigeration system within the building is greater than the first predetermined amount, prevent one or more ignition devices from igniting for at least the predetermined period.

11. A method, comprising:
in response to a determination that an amount of a refrigerant of a refrigeration system that is present outside of the refrigeration system within a building is greater than a first predetermined amount, maintaining a compressor of the refrigeration system off continuously for at least a predetermined period;
in response to the determination that the amount of the refrigerant that is present outside of the refrigeration system within the building is greater than the first predetermined amount, maintaining a fan on continuously for at least the predetermined period,
wherein the fan moves air across an evaporator of the refrigeration system when the fan is on;
without receiving input indicative of a reset of the refrigeration system, after the compressor has been off for the predetermined period and the amount of refrigerant that is present outside of the refrigeration system within the building is less than a second predetermined amount, automatically turning the compressor on; and
after a predetermined number of refrigerant leak events occur, disabling the refrigeration system until user input indicative of a manual reset is received.

12. The method of claim 11 further comprising measuring the amount of the refrigerant that is present outside of the refrigeration system within the building using a sensor.

13. The method of claim 12 wherein the sensor is disposed adjacent to the evaporator.

14. The method of claim 11 wherein the second predetermined amount is less than the first predetermined amount.

15. The method of claim 11 wherein maintaining the compressor off includes maintaining the compressor off until the input indicative of the manual reset of the refrigeration system is received when the amount of the refrigerant present outside of the refrigeration system within the building exceeded a third predetermined amount.

16. The method of claim 15 wherein the third predetermined amount is greater than the second predetermined amount.

17. The method of claim 15 wherein the third predetermined amount is at least 20 percent of a lower flammability limit (LFL) of the refrigerant.

18. The method of claim 11 further comprising, in response to the determination that the amount of the refrigerant that is present outside of the refrigeration system within the building is greater than the first predetermined amount, preventing one or more ignition devices from igniting for at least the predetermined period.

* * * * *